United States Patent [19]
Brenez

[11] 3,785,531
[45] Jan. 15, 1974

[54] POWDER SPRAY APPLICATOR DEVICE

[76] Inventor: Jean C. Y. Brenez, 149 Avenue de General-Leclerc, Pessac, France

[22] Filed: Mar. 24, 1972

[21] Appl. No.: 237,636

[30] Foreign Application Priority Data
Apr. 15, 1971 France .......................... 7114241

[52] U.S. Cl. .............................................. 222/193
[51] Int. Cl. ............................................ B05b 7/00
[58] Field of Search .................. 222/193, 195, 398; 128/266; 239/204

[56] References Cited
UNITED STATES PATENTS

| | | | |
|---|---|---|---|
| 1,571,311 | 2/1926 | Wittjen | 222/193 |
| 1,869,483 | 8/1932 | Knapp et al. | 222/193 |
| 1,768,919 | 7/1930 | Moore | 239/204 |
| 3,157,318 | 11/1964 | Pottle | 222/193 |

Primary Examiner—Allen N. Knowles
Assistant Examiner—Andres Kashnikow
Attorney—Arthur B. Colvin

[57] ABSTRACT

The invention relates to a powder application device having a cylindrical outer casing in which is telescoped a cylindrical inner casing. One end of the outer casing is closed by a transverse wall and the opposed end of the inner casing is also closed by a transverse wall having a central opening controlled by a valve. The other end of the inner casing has a transverse wall having a central opening which is also controlled by a valve.

8 Claims, 4 Drawing Figures

PATENTED JAN 15 1974   3,785,531

POWDER SPRAY APPLICATOR DEVICE

The present invention relates to a powder applicator device for spraying any product, and more particularly any of the insecticides and powdered products used against insects and the like attacking plants and shrubs.

It is a known fact that such spraying devices are in common use against plant and fruit tree insects and diseases. They are generally constituted by two telescoped, cardboard tubes, the inner tube containing the product to be sprayed and the outer one acting as a pulsed air pump. The lower part of the latter tube is equipped with a valve, and the lower part of the inner tube is also provided with another valve. The reciprocating movement imparted to the outer tube relative to the inner tube opens the valve in the outer tube during the extension stroke of the device and fills this tube with air, while the valve in the inner tube closes, imprisoning the powder. With the return movement, the valve in the outer tube closes and the valve in the inner tube opens, receiving the pulsed air from the outer tube, which projects the powder into a receptacle or so-called diffusion chamber and toward the spray orifice and the outside.

These devices have many drawbacks, the most serious of which is that they are made of cardboard, the hydrophilic nature of which is well known; wet tubes, or simply ones which have absorbed moisture will swell, jam and become unserviceable after several uses.

Furthermore, the valve on the outer tube is directly in contact with the atmosphere and consequently offers a greater passage and path for moisture.

Among the minor drawbacks, there is the fact that the stroke of the reciprocating movement is not limited in the outward extension of the device and that often the two tubes will come apart. Another defect is that the jet of sprayed product is perpendicular to the longitudinal axis of the device and the effectiveness of control of the said jet is uncertain.

To remedy these drawbacks, the present invention provides technological details such as a powder applicator device that is constructed entirely of synthetic material and hence is safe from any warping due to moisture.

The two valves are combined in a single unit inside the tubes and hence are also safe from moisture. The inner tube is provided with two longitudinal grooves, diametrically opposed, receiving two studs borne by the outer tube, which limit the stroke of the reciprocating movement. A top cover, deformable by nature, provides a diffusion chamber during the extension stroke and allows the pulsed air to pass during the reverse stroke, thereby spraying powder which escapes through a slot provided in the said cover and projecting the jet in the direction of the longitudinal axis of the device to increase the effectiveness of control of said jet.

One characteristic of the present invention is the construction of the powder applicator device of synthetic material, in order to protect both the contents and the components of the said device from moisture and insure regular and constant operation thereof.

Another characteristic of the invention is the provision of a powder applicator device constituted by a hollow, cylindrical body, forming an inner tube, sliding in another hollow cylindrical body forming an outer tube, the lower part of which is closed; the telescoping tubes being operable by a reciprocating movement.

Still another characteristic of the present invention is the provision of a wall closing the upper part of the inner tube and provided with a central opening. The upper part of said tube is closed by a hood or cap having a central, frusto-conically shaped portion which closes the central opening of the wall during the extension stroke, the hood warping or deforming as it gives off the pulsed air during the return stroke, entraining the powder to be sprayed. The region between the wall and the hood acts as a diffusion chamber, which is provided with a slot for the escape of the powder sprayed outward in the direction of the longitudinal axis of the powder applicator device.

Another characteristic of the invention is the closing of the lower part of the inner tube by a member forming a valve seat on one side for a closure valve, the latter being secured to a piston located on the other side of the seat, said piston sliding inside the outer tube, the whole forming an assembly completely protected from attack by outside moisture.

Yet another characteristic of the present invention is the provision of clearance between portions of the tubes, together with means to limit the stroke of the reciprocating movement during the spraying operation.

In the accompanying drawing in which is shown one of various possible embodiments of the several features of the invention:

Figure 1:
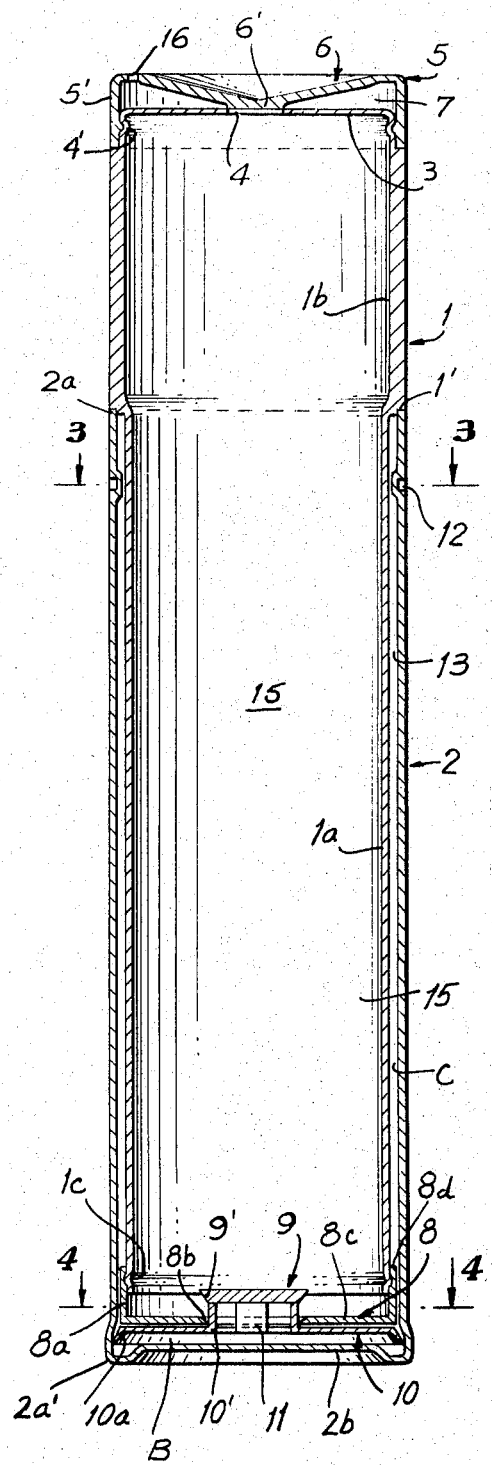
FIG. 1 is a longitudinal section view of the powder applicator device, showing the valve separated from its seat, at the moment of the start of the extension cycle of the said device.
Figure 2:
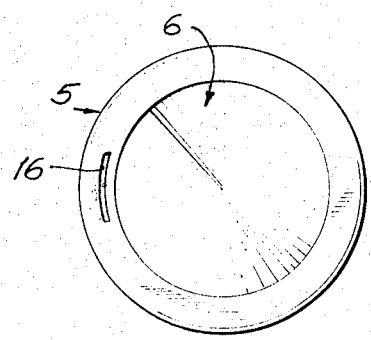
FIG. 2 is a top plan view of the powder applicator device.

Referring now to the drawing, as shown in FIG. 1, the device comprises a cylindrical inner tube 1 comprising a lower portion 1a and an upper portion 1b of larger diameter than said lower portion defining an annular stop shoulder 1'.

The upper end of the upper portion 1b is of reduced diameter as at 4' and is provided with a transverse wall 3 having a central opening 4. Encompassing the reduced diameter wall 4' is the side wall 5' of a hood or cap 5, the side wall 5' having an annular bead which snaps into an annular groove in said wall 4'.

The hood 5 has a central frusto-conical portion 6 which is movably mounted by reason of the flexibility of the material from which the hood is made, and the apex of said portion 6 defines a valve 6' normally retained against the periphery of the opening 4 in wall 3 to close said opening. The region between the wall 3 and the frusto-conical portion 6 defines a diffusion chamber 7, having a discharge opening in the form of a slot 16 near the periphery thereof.

The lower end 1c of the lower portion 1a of tube 1 is encompassed by the side wall 8a of a cap 8, the latter having a central opening 8b in the floor 8c thereof with a beveled edge defining a valve seat.

The cap 8 is illustratively releasably secured to the lower end 1c of the lower portion 1a by the coaction of an annular groove in the inner surface of side wall 8a with an annular bead formed on the outer surface of the lower end 1c.

Associated with opening 8a is a valve disc 9 having a beveled periphery 9' designed to move against the beveled periphery of opening 8b to close the latter. The valve disc 9 has a plurality of spaced depending legs or struts 11 which extend through opening 8b to guide the valve disc 9, and the lower ends of the legs 11 are secured to the periphery of an opening 10' in a piston 10 positioned beneath the floor 8c of cap 8.

The lower portion 1a of the inner tube 1 is encompassed by a cylindrical outer tube 2 of inner diameter sufficiently greater than lower portion 1a to define an annular channel c therebetween. The outer diameter of tube 2 is substantially the same as that of the upper portion 1b of tube 1 so that in retracted position of tube 2, its upper edge 2a will abut against stop shoulder 1'.

The lower edge 2a' of the outer tube 2 has a transverse wall 2b secured thereto and illustratively formed integral therewith.

As shown in FIG. 1, the piston has a flexible beveled periphery 10a which engages the inner wall surface of outer tube 2 to define a seal when the outer and inner tubes are telescoped together and to permit passage of air when the tubes are moved outwardly relative to each other.

Figure 3:
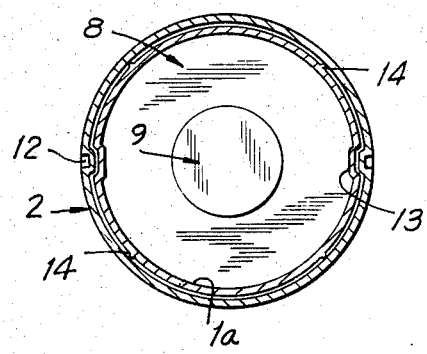
FIG. 3 is a sectional view taken along line 3—3 of FIG. 1.
Figure 4:
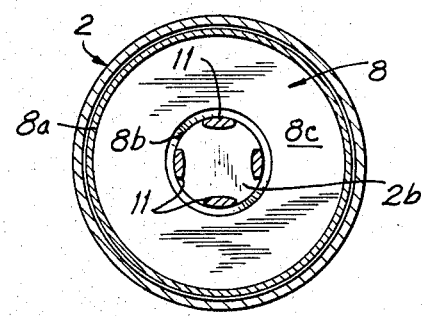
FIG. 4 is a sectional view taken along line 4—4 of FIG. 1.

In order to guide the inner tube with respect to the outer tube, as shown in FIGS. 1 and 3, the outer tube 2 has a plurality of inwardly extending studs 12 which extend into longitudinal grooves 13 formed in the lower portion 1a of tube 1 and extending longitudinally thereof. In addition, a plurality of circumferentially spaced protrusions 14 are formed on the outer surface of the lower portion 1a to guide the outer tube 1. In the extended position of the tubes, the studs 12 will abut against the edge 8d of the side wall 8a of cap 8 to limit such extension.

In the operation of the device with the chamber 15 defined by the lower portion 1a of inner tube 1 filled with the powder to be dispensed, the inner and outer tubes 1 and 2 are moved outwardly relative to each other, such outward movement being limited by the abutment of studs 12 against the rim 8d of the side wall 8a of wall 8.

Due to the suction effect caused by such extension, the valve 9 will move against the valve seat defined by the central opening 8b to close the latter.

Air will be drawn past the flexible periphery 10a of piston 10 and between the space between the side wall 8a of cap 8 and the outer tube 2 and through the annular clearance C from the exterior to fill the chamber B between the wall 2b and the piston 10.

When the tubes 1 and 2 are telescoped together, the compressed air in chamber B will urge the flexible periphery 10a of piston 10 against the wall of tube 2 to form a seal and the compressed air will also move the valve 9 to open position and flow into the powder in tube 1 entraining such powder to the opening 4 in wall 3. The pressure of the air through opening 4 reacting against the valve 6' will deflect the latter upwardly away from the opening 4 so that the entrained powder will fill the cavity 7 and be ejected through discharge slot 16.

It is within the scope of the invention to utilize other types of valve to control the opening 4 and 8b. The tubes are preferably of non-porous synthetic material to prevent moisture from affecting the powder to be sprayed.

Having thus described my invention, what I claim as new and desire to secure by Letters Patent of the United States is:

1. A powder spray applicator device comprising a pair of coaxial tubes defining an inner tube and an outer tube slidably mounted with respect to each other, said inner tube defining a powder chamber, transverse walls closing opposed ends of said inner tube, each of said walls having an opening therethrough, valve means controlling each of said openings, means normally retaining one of said valve means in closed position, said outer tube having a transverse wall closing one end thereof, the portion of said outer tube between the closed end thereof and the adjacent closed end of said inner tube defining an air chamber, a piston in said air chamber, having an opening therethrough and operatively connected to the other valve means to move in unison therewith, said piston having a flexible periphery normally engaging the side wall of said outer tube to define a seal between the air chamber and the exterior.

2. The combination set forth in claim 1 in which means are provided to limit the relative movement of said tubes away from each other.

3. The combination set forth in claim 1 in which clearance is provided between adjacent portions of said tubes to define a passageway to the exterior, said flexible periphery of said piston sealing said passageway when said tubes are telescoped together, whereby said piston will move the associated valve member to open position.

4. The combination set forth in claim 1 in which means are provided to maintain said tubes in coaxial relation as they are moved relative to each other.

5. The combination set forth in claim 1 in which a cap is releasably connected to the inner end of said inner tube, said cap having a floor defining the transverse wall closing said end of said tube.

6. A powder spray applicator device comprising a pair of coaxial tubes defining an inner tube and an outer tube slidably mounted with respect to each other, said inner tube defining a powder chamber, transverse walls closing opposed ends of said inner tube, each of said walls having an opening therethrough, valve means controlling each of said openings, means normally retaining one of said valve means in closed position, a cover member encompassing the end of the inner tube with which the normally closed valve means is associated, said cover member having a frusto-conical central portion movably mounted with respect thereto, the apex of said frusto-conical portion defining the valve means, said outer tube having a transverse wall closing one end thereof, the portion of said outer tube between the closed end thereof and the adjacent closed end of said inner tube defining an air chamber, a piston in said air chamber, having an opening therethrough and operatively connected to the other valve means to move in unison therewith, said piston having a flexible periphery normally engaging the side wall of said outer tube to define a seal between the air chamber and the exterior.

7. The combination set forth in claim 6 in which said cover member is releasably connected to said inner tube.

8. The combination set forth in claim 6 in which the region between the frusto-conical portion of said cover member and the adjacent transverse wall defines a diffusion chamber, said cover means having a discharge opening leading into said diffusion chamber.

* * * * *